United States Patent [19]
Whitener

[11] 4,165,058
[45] Aug. 21, 1979

[54] TANDEM WING AIRPLANE

[75] Inventor: Philip C. Whitener, Seattle, Wash.

[73] Assignee: The Boeing Company, Seattle, Wash.

[21] Appl. No.: 745,150

[22] Filed: Nov. 26, 1976

Related U.S. Application Data

[62] Division of Ser. No. 648,706, Jan. 13, 1976.

[51] Int. Cl.² .............................................. B64C 3/08
[52] U.S. Cl. .................................... 244/45 R; 244/15
[58] Field of Search ................. 244/45 R, 45 A, 13, 244/15, 12.1; D12/76, 77; 244/55

[56] References Cited

U.S. PATENT DOCUMENTS

| | | | |
|---|---|---|---|
| D. 188,226 | 6/1960 | Jones et al. | D12/76 |
| 1,928,317 | 9/1933 | Rippen | 244/45 R |
| 3,159,361 | 12/1964 | Weiland | 244/12.1 |
| 3,244,246 | 4/1966 | Weiland | 244/12.1 X |

*Primary Examiner*—Barry L. Kelmachter
*Attorney, Agent, or Firm*—Laurence A. Savage; Bernard A. Donahue

[57] ABSTRACT

A tandem wing aircraft is provided having two independent spaced apart fuselages and two wings of similar area, a lower forward wing and a higher aft wing. The lower forward wing is attached to the forward region of each of the spaced apart fuselages; the higher aft wing is aerodynamically spaced apart from and located above the aft region of the spaced apart fuselages. An aft strut member is disposed between the aft wing and each of the fuselages; each aft strut member has a length sufficient to cause the wing tips of the lower forward wing and the upper aft wing to be vertically spaced apart by a distance of at least 25% of the span of either of the wings.

3 Claims, 11 Drawing Figures

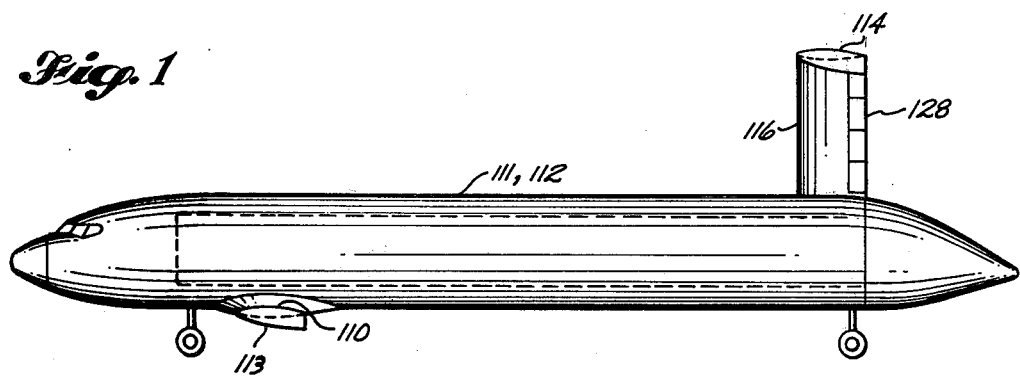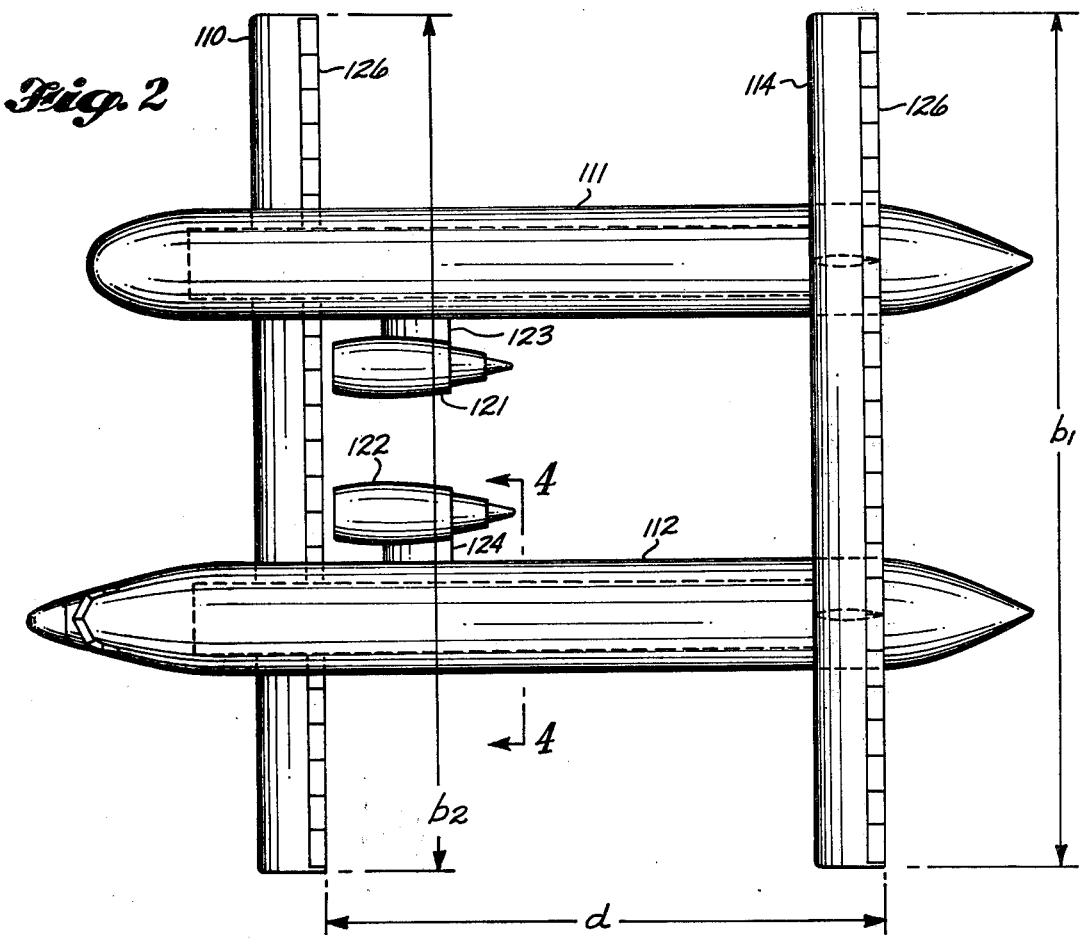

Fig. 9
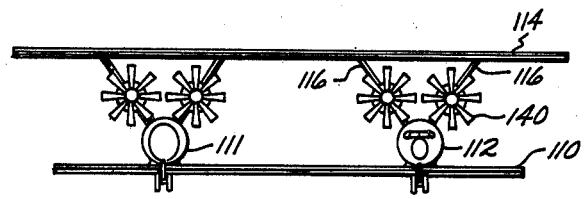
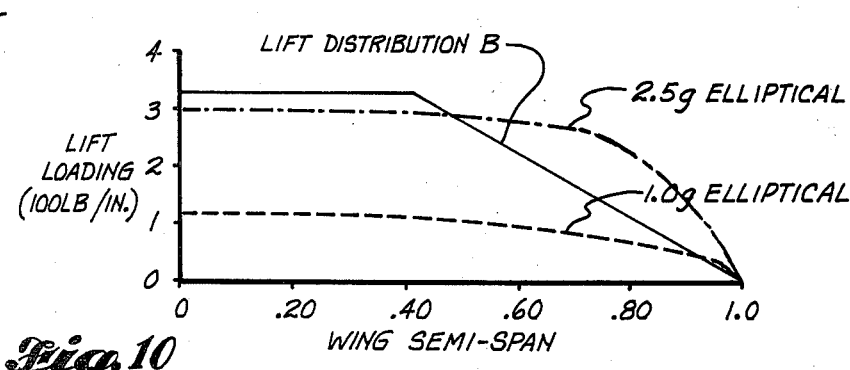
Fig. 10
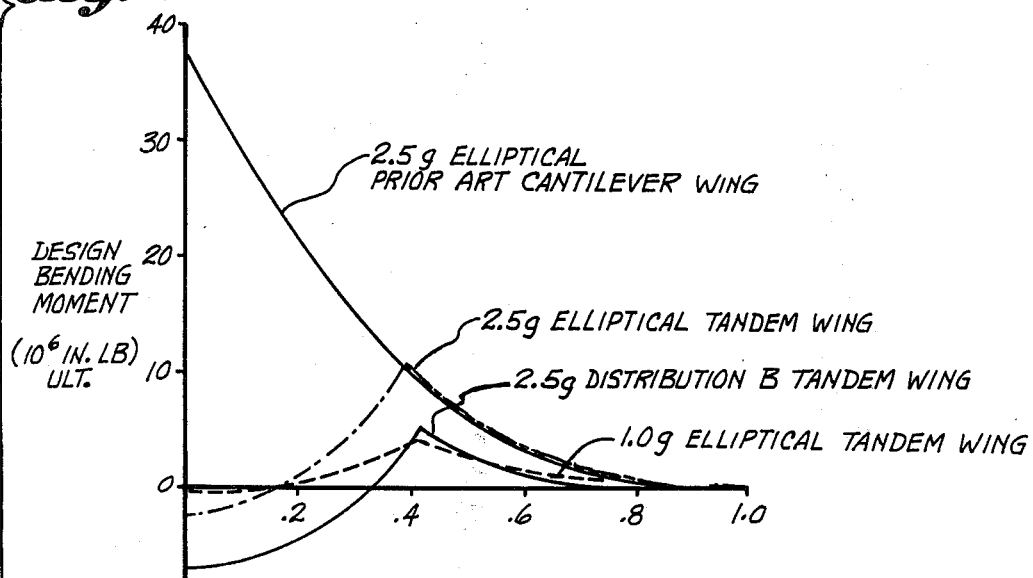
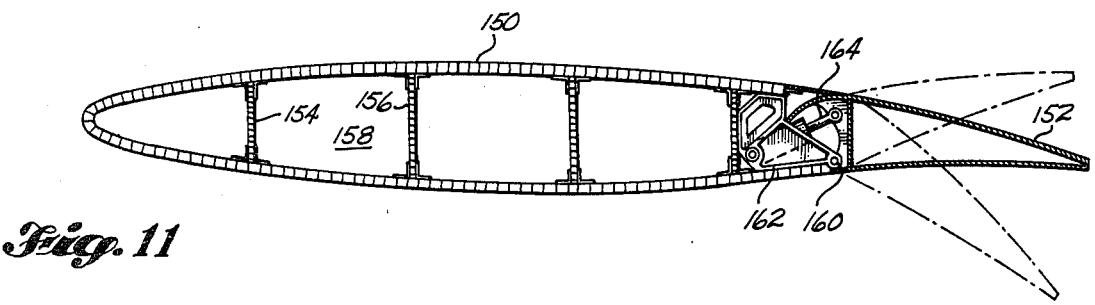
Fig. 11

TANDEM WING AIRPLANE

This is a division, of application Ser. No. 648,706, filed Jan. 13, 1976.

FIELD OF THE INVENTION

This invention relates to aircraft configuration design concepts; and, more particularly, to tandem wing aircraft having two independent spaced apart fuselages and having a lower first wing located near the forward end of the fuselages, and a higher second wing located at the aft end of the fuselages.

BACKGROUND OF THE INVENTION

Virtually all modern commercial jet aircraft in use today utilize a single wing extending laterally in both directions from a central portion of the fuselage. Such aircraft are designed and loaded so that the overall aircraft center of gravity will be located just forward of the aerodynamic center of lift of the wing; as required by stability considerations.

In flight the aircraft is balanced about the pitch axis by a balancing tail load, which normally acts downwardly. The balancing tail load is provided by a stabilizer, or horizontal tail surface, at the aft end of the fuselage. The stabilizer has small control surfaces called elevators to adjust the magnitude and direction of the tail load. The lift provided by the wing must be sufficient not only to lift the gross weight of the aircraft, but to compensate for any downward acting tail load. Accordingly, when such tail loads are high, as at takeoff, the allowable gross weight of an aircraft is significantly reduced. Moreover, drag loads are high on both the wing and tail surfaces.

In such conventional single wing aircraft, the fuselage structure is effectively two cantilever beams; one extending forward and the other aft of the wing. Maximum fuselage bending moments therefore occur near the wing in the central region of the fuselage. Furthermore, as will be more fully developed in the discussion which follows, because of "area-ruling" requirements, the fuselage structure of high speed aircraft must normally be reduced in diameter in this same central region of the fuselage. Such reduction in diameter of the fuselage is in widespread use today in supersonic aircraft design, and is known in the industry as "coke-bottling" of the fuselage. Not only are substantial structural weight penalties incurred by having the maximum loads at the minimum section, but in commercial passenger aircraft undesirable seat and aisle arrangements are required, and main landing gear stowage space is severely limited, sometimes requiring external fairing.

In such conventional single wing aircraft, the wing structure is effectively two cantilever beams; one beam extending in each direction laterally from the fuselage. Design bending moments increase rapidly from a minimum at the tip to a maximum at the root of each wing semi-span. In order to reduce drag, vertically thin and higher aspect ratio (wing span/effective average wing chord length) wings are desirable. However, such longer wings tend to create prohibitively high structural bending moments on the desired thin wing sections. Considerable research has been done in recent years on optimum wing cross-sectional shapes. "Supercritical airfoil" and "natural laminar flow" wing sections have been developed to reduce shockwave formation and promote laminar or non-turbulent flow over the section. Such wing shapes tend to have aerodynamic centers located farther aft on their sections (of the order of 40% chord as opposed to some 30% chord for a typical conventional section). This further aggrevates the balancing tail load problem previously discussed, requiring that still more downward acting tail load be made available.

Roll control in a conventional single wing aircraft is normally achieved by ailerons located in outboard regions of the wing. Lift control, as for takeoff and landing, is achieved by flaps extending from aft (and sometimes forward) portions of inboard regions of the wing. Spoilers extending upwardly from the wing are often used as speed brakes or to reduce lift. Accordingly, the wing, particularly its trailing edge, is crowded with primary and secondary control surfaces. The horizontal tail, with its elevator control surface, is normally dedicated exclusively to pitch control. The fin, or vertical tail, and its rudder are normally dedicated to yaw control.

Because of the complexity of modern aircraft, and the number of control surfaces, they are becoming increasingly difficult to fly manually. Accordingly, complex computerized "stability augmentation" and automatic pilot systems have been designed to automatically adjust control surfaces and reduce pilot work load. For safety reasons, it is extremely desirable that these computerized systems be redundant; i.e., that more than one, and preferably up to four, of such systems be completely independent, and each capable of achieving a desired maneuver for the aircraft. However, such multiple redundancy is extremely difficult, if not impossible, to attain in conventional single wing designs. The space available for the multitude of control surfaces required for such redundancy is inherently limited, and only one region of the aircraft is available in some cases to achieve the desired degree of control (e.g., stabilizer for pitch, and fin for yaw control).

Accordingly, it is a general objective of this invention to provide an aircraft configuration in which: (1) a downward acting balancing tail load is not required; (2) it is not necessary to reduce the fuselage diameter in its central region when area-ruling is required; (3) structural weight of the fuselage is reduced; (4) the wing structural weight is reduced; (5) higher aspect ratio wing sections may readily be utilized for reduced drag; (6) recently developed supercritical and natural laminar flow wing sections may be used; and (7) there is a plurality of flight control systems, each independently able to control the aircraft to provide redundancy for flight safety.

SUMMARY OF THE INVENTION

The foregoing and other objectives of this invention have been achieved in a tandem wing aircraft having two independent spaced apart fuselages and having a lower first wing located near the forward end of the fuselages and attached directly to the fuselages. A higher second wing is located above the aft end of the fuselages and is aerodynamically separated from the fuselages by strut structure. Pitch control is achieved by increasing or decreasing the lift on either wing; but downward acting load is not required. The tips of the two wings are preferably vertically separated by at least 25% of the minimum span of either wing. The two wings normally are of similar, but not necessarily equal, span and area. Control redundancy is readily achieved because of availability and location of control surfaces on strut and wing structure. Higher aspect ratio wing shapes may be used because of inherently reduced bending moments on each wing.

BRIEF DESCRIPTION OF THE DRAWINGS

FIG. 1 is a side elevation view of a twin fuselage embodiment of the tandem wing aircraft of this invention.

FIG. 2 is a plan view of the aircraft of FIG. 1.

FIGS. 5, 6, 7, 8, and 9 are each front elevation views of optional embodiments of twin fuselage tandem wing aircraft of this invention.

FIG. 10 is a schematic diagram of wing semi-span loading and bending moments illustrating the reduction in design bending moments obtainable with the aircraft of this invention.

FIG. 11 is a schematic cross-section view of a wing construction for minimum structural weight.

DESCRIPTION OF THE PREFERRED EMBODIMENTS

Figure 3:
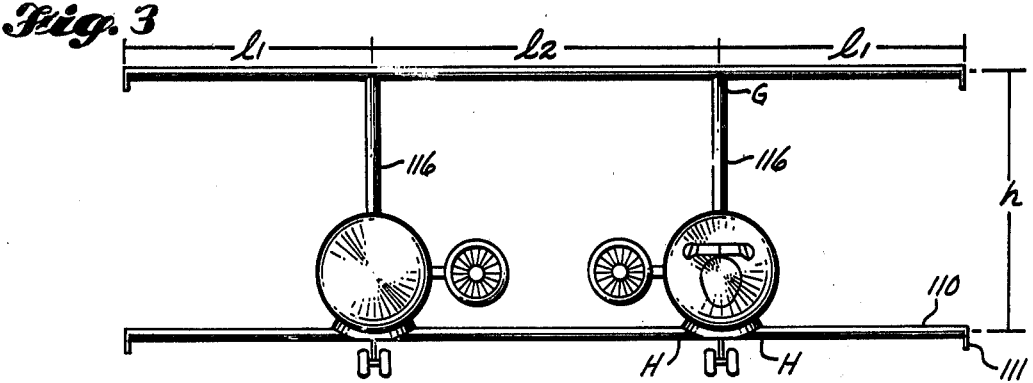
FIG. 3 is a front elevation view of the aircraft of FIG. 1.
Figure 4:
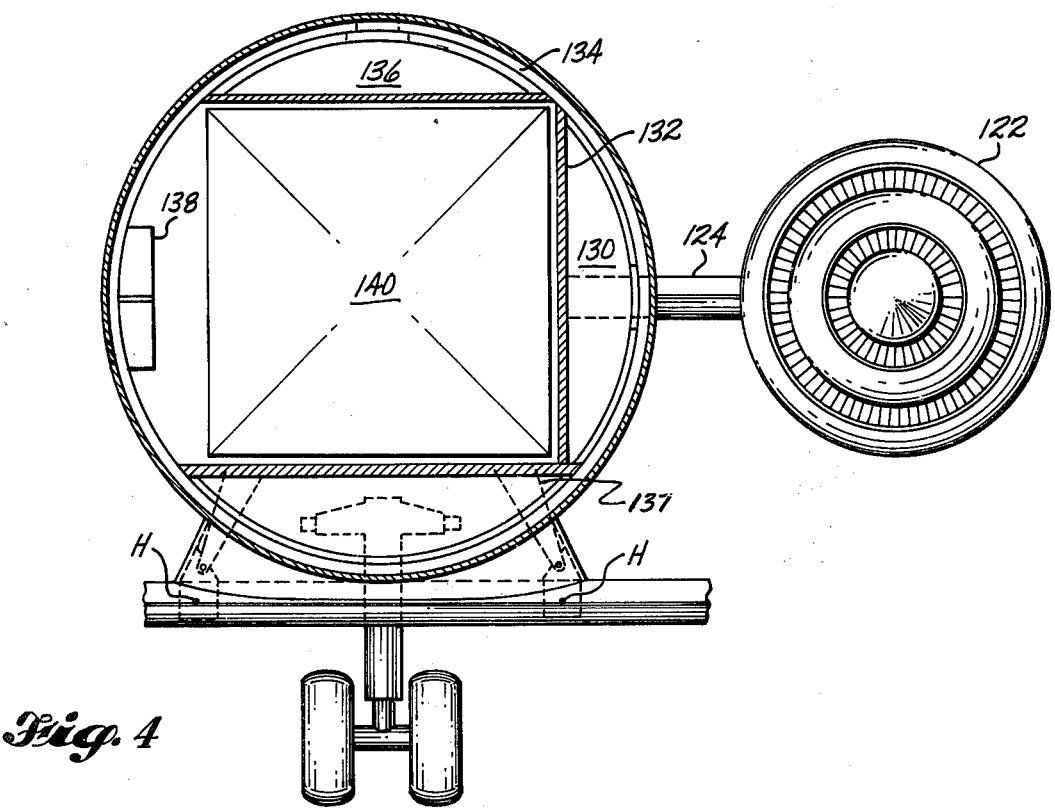
FIG. 4 is a cross-section view taken at 4—4 in FIG. 2.

FIGS. 1–4 show a tandem wing, twin fuselage embodiment of this invention in a proposed preliminary design for a relatively short-range freighter aircraft. Forward wing 110 is attached to the lower region of a first fuselage 111 and a second fuselage 112 at points H (see FIGS. 3 and 4). Aft wing 114 is mounted atop vertical struts 116 which are attached to fuselage structure.

It will be noted that the struts 116 are of significant length—a length sufficient to cause the wing tips of the lower forward wing 110 and the wing tips of the upper aft wing 114 to be vertically spaced apart a distance of at least 25% of the span of either of the wings. Engines 121 and 122 are attached to fuselage structure by struts 123 and 124. Control surfaces 126 and 128, similar to those of previous embodiments, are provided. This is to assure aerodynamic separation of the wing from the fuselage. The wings are of approximately equal area. The fuselages are supported near each end, in the manner of simple beam, thereby significantly reducing fuselage bending loads over a comparable cantilevered fuselage in a single wing aircraft. As will readily be appreciated by persons skilled in this art, substantial structural weight savings in the fuselages are thereby achieved. As can be seen in FIGS. 1 and 2 the fuselages may have a substantially constant cross-section over much of its length.

Biplane aircraft have been known since the earliest days of aviation. These aircraft usually included two or more wings vertically spaced apart but longitudinally aligned which offered certain structural, and other, advantages over single wing configurations. However, the induced drag caused by interaction of the airflows of the two wings was relatively high, and therefore the industry turned to a single wing aircraft as soon as these problems were resolved. The location of the two wings of the tandem wing aircraft of this invention is such that the induced drag due to interaction of the flows around the wing is minimized. The total induced drag of the aircraft is in a range generally considered acceptable for single wing aircraft.

As is best seen in FIG. 3, the wing 110 is spaced apart from wing 114 by a distance h measured between wing tips. The most pertinent wing spacing parameter for induced drag is believed to be wing tip spacing, rather than an average spacing of the two wings, primarily because of wing tip vortices. In the preferred embodiments of this invention h/b will range from about 0.25 to 0.50 when measured against either wing span; this considering the trade-off effects of reducing induced drag by increasing the wing spacing, h, against an increase in parasite and other drag caused by lengthening the aft wing struts. In certain wing tunnel model testing conducted to date, a parameter $b_{ref}=\sqrt{b_1^2+b_2^2}$ has been used in computing wing spacing relationships. Such $h/b_{ref}$ values are of course significantly less than those for either $h/b_1$ or $h/b_2$, although describing the same aircraft.

It is contemplated at the present time that the wings of the aircraft be separated longitudinally along the aircraft fuselage as far as possible to reduce their interaction; this taking into account the many other unrelated factors in design of an overall aircraft. It is presently considered that most of the embodiments of the invention will have longitudinal wing spacings of the order of at least 40% of the fuselage length.

It is also contemplated at this time that the total lift be distributed as closely as possible between the two wings. Certain emperical induced drag estimates have indicated best performance with equal lift distribution. However, many other factors such as payload, fuel, and engine arrangement must be taken into account and the lift distribution between wings adjusted accordingly. The embodiments considered to date have had a lift distribution ranging from 40% to 60% of total lift for either wing. Wing lifting areas will of course generally correspond to this same range. Because of the inherent advantages previously discussed, only wing aspect ratios exceeding eight have been considered to date. In FIG. 2 twenty control surfaces 126 are shown to be available on each wing. It is contemplated that at least twelve such control surfaces be provided for most embodiments of this invention. The outer span control surfaces 126 may advantageously be used as low speed ailerons; midspan control surfaces 126 as high speed ailerons and flaps; and inner-span control surfaces as elevators and flaps, as will readily be understood by persons skilled in this art. The wing struts 116 may each be provided with a plurality of individual rudder control surfaces 128. Four separate surfaces 128 on each of the four struts, as shown in FIG. 1, provide multiple options with modern control systems. The control surfaces 126 and 128 are preferably individually actuated and positioned by a computerized flight control system.

This invention contemplates the use of a plurality of and preferably four individual control systems each independently capable of maneuvering the aircraft. Since each wing is a lifting surface, a downward acting control load, such as the balancing tail load of conventional aircraft, is not required. Therefore, takeoff gross weight is not penalized by balancing tail load. Rapid and balanced vertical translation without pitch, either upwardly or downwardly, may be achieved by increasing or decreasing lift on both wings simultaneously. Independent pitch and roll control can be achieved by the control surfaces on either of the two wings. Yaw control can be achieved by any number of combinations of individual strut control surfaces 128, which function as rudder surfaces.

Furthermore, it is contemplated that such control systems may be computer operated to tailor and limit the structural loads applied to each wing. For example, the positions of each of the individual control surfaces 126 may be set to optimize the span lift distribution.

It is contemplated that this aircraft could advantageously use advanced technology composite graphite and fiberglass construction, thereby further enhancing the structural weight advantages previously discussed. In FIG. 15, the engine strut 124 extends through fuselage 112 and connects to a honeycomb web structure 130 having an inner cap member 132, which preferably is of the graphite "pultrusion" type. The outer cap member for the web structure 130 is provided by the basic fuselage framework 134, which preferably is constructed of a continuous fiberglass honeycomb core of the order of four inches thick, with continuous fiberglass and graphite skin members. The tie between strut member 116 and the fuselage 112 and the tie to forward wing attach struts 137 and the landing gear in the lower region of the fuselage is made in similar fashion. With the structural arrangement shown, the left side of the fuselage structure is left open for raceways 138 to contain electrical wiring and/or control cables for the aircraft. A square region 140 is adequate to accept larger freight containers of the type in common use today ($8' \times 8' \times 20'$).

In the FIGS. 1-4 embodiment, twenty-four control surfaces are provided on each wing, and four on each vertical strut 116. The wing spans $b_1$ and $b_2$ aspect ratio, and area may be the same for each wing. The wings are separated a distance h (FIG. 3) such that $h/b_1$ is approximately 0.3. Both the forward and aft wings have major supports at two separate points (see $1_1, 1_2, 1_1$ FIG. 3) coinciding with the location of the tandem fuselages. Hence, the typ of continuous beam support discussed previously is present in both wings, with attendant weight advantages. Furthermore, it is contemplated that the wings, vertical struts and engine supports each be constructed of similar, if not the same, structural sections of graphite fiber and fiberglass. It is believed that such an aircraft would be economical to manufacture, and would have structural weight advantages over conventional aircraft of considerable magnitude.

FIGS. 5, 6, 7, 8 and 9 are each front elevation views of optional embodiments of twin fuselage tandem wing aircraft of this invention.

Figure 5:
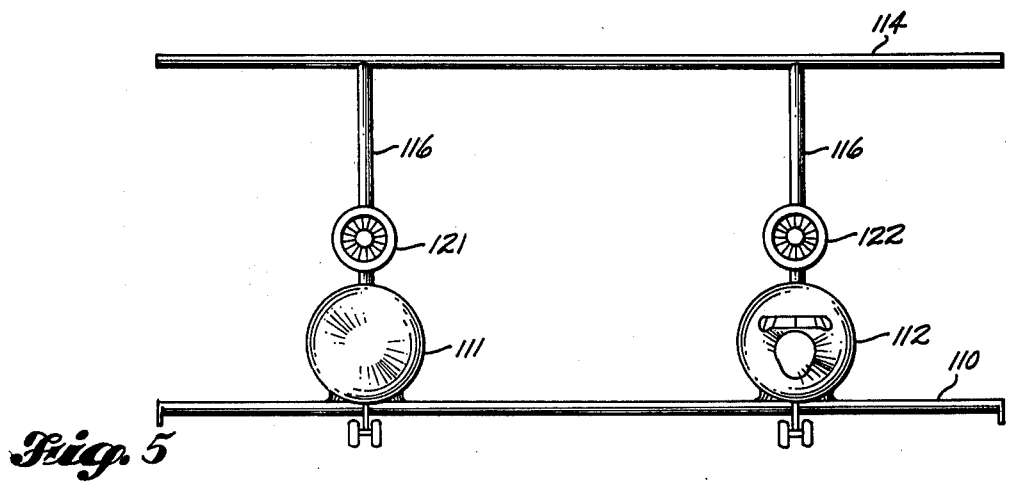
Figure 6:
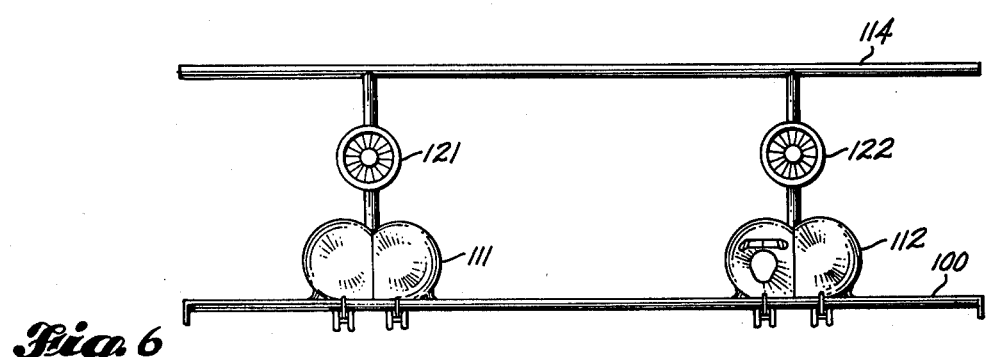
Figure 7:
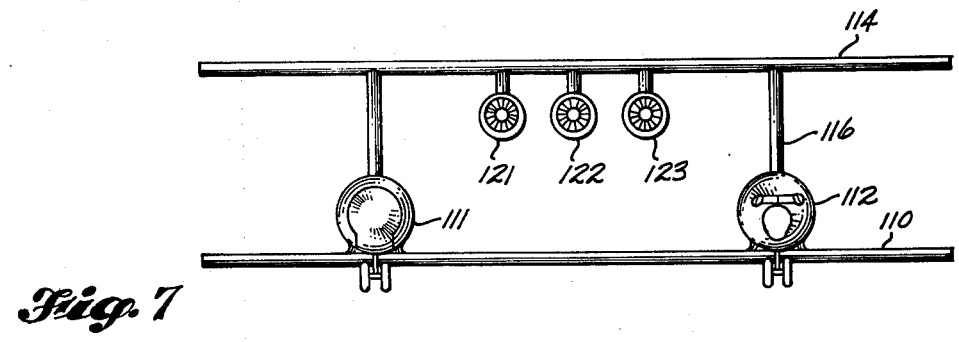
Figure 8:
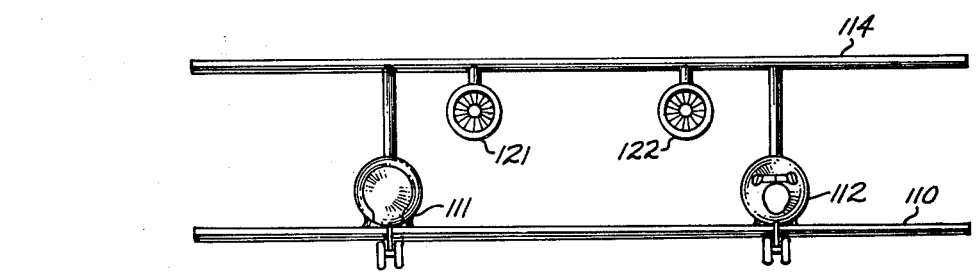

FIG. 5 shows the engines to be mounted in the vertical struts 116. FIG. 6 further utilizes a double section for each fuselage to thereby increase volume with minimum cost. FIG. 7 and 8 each have engines mounted on the aft wing. FIG. 9 has the aft wing 114 mounted on two pairs of V-struts, a pair of struts 116 extending from each fuselage. Propeller type engines 140 mounted on each of the four strut members.

FIG. 10 shows certain lift load and design bending moment distributions over a typical wing semi-span, for both a conventional cantilever wing and the two-support continuous beam type wings in the preferred embodiments of this invention. The dotted line plots in the upper loading diagram show typical lift loadings for 1.0 g cruise, and 2.5 g maneuver conditions. The solid line plot labeled "Lift Distribution B" is representative of the type of loading readily available with the tandem wing aircraft when a computer controlled actuation means for tailoring load distribution is used. In the lower design bending moment plot of FIG. 10 it can be seen from the upper solid line curve that the 2.5 g elliptical moments on a prior art cantilever wing rise rapidly and continuously to a maximum at the wing root. The dotted line plots labeled 1.0 g and 2.5 g elliptical are typical of what can be expected with the two-support continuous beam wing concepts of the tandem wing airplane. The 2.5 g tandem wing plot shows the same values as the cantilever wing plot until the first support or strut is reached at about 0.40 span. As will readily be understood by persons skilled in this art, the moment is then reduced over the remaining innerspan by the amount proportional to the strut reaction. In this manner the design bending loads for the continuous beam wing are grossly reduced over those for the cantilever wing. A further reduction obtainable with the computer controlled "Load Distribution B". Note that the Distribution B curve shows only slightly higher bending moments than the 1.0 g design condition. Since the 1.0 g condition exists during cruise, while 2.5 g exists only during an extreme maneuver, it will be apparent that a near optimum reduction in design loads can be achieved. It should be noted that these diagrams are included for purposes of illustration only and no representation whatsoever is made concerning the absolute values shown.

FIG. 11 shows a modern airfoil section which is particularly well adapted to be used with the twin fuselage tandem wing aircraft embodiment of FIGS. 1-4. The airfoil section comprises an outer skin structure which is preferably honeycomb sandwich with graphite and fiberglass skins. The webs 154 and 156 are of similar construction and the cap members are composite pultrusions. The control surface 152 pivots about point 160 on fitting 162, and is actuated by a actuator 164, here shown as a simple hydraulic cylinder. It should be noted that the aircraft of FIGS. 1-4 may economically use this type of airfoil section not only for its wings, but for its wing strut and engine strut members as well.

There has thus been described preferred embodiments of a tandem wing aircraft in accordance with the present invention. It will be understood by those skilled in the art that the advantages of my invention can be realized in various forms. Therefore, it should be understood by those skilled in the art that various changes in the form and detail thereof may be made therein without departing from the spirit and scope of the invention, which is to be limited only as set forth in the following claims.

I claim:

1. In a tandem wing aircraft having fuselage structure and lifting surfaces, the improvement comprising in combination:

two independent spaced apart fuselages;

a lower forward wing and a higher aft wing, each of said wings having a lifting area ranging from 40% to 60% of the combined total lifting area of all of said lifting surfaces of said aircraft for producing a lift force and for providing aircraft pitch control without production of a downwardly acting load; said lower forward wing being attached to the forward region of each of said spaced apart fuselages; said higher aft wing being aerodynamically spaced apart from and located above the aft region of each of said spaced apart fuselages; and an aft strut member disposed between said aft wing and each of said spaced apart fuselages for attaching said aft wing to said spaced apart fuselages, said aft strut members having a length sufficient to cause the wing tips of said lower forward wing and said higher aft wing to be vertically spaced apart a distance of at least 25% of the span of either of said wings.

2. The aircraft of claim 1 wherein said lower forward wing is attached to the underside of each of said two independent spaced apart fuselages.

3. In a tandem wing aircraft having fuselage structure and lifting surfaces, the improvement comprising in combination:

two independent spaced apart fuselages;

a lower forward wing and a higher aft wing, each of said wings having a lifting area ranging from 40% to 60% of the combined total lifting area of all of said lifting surfaces of said aircraft; said lower forward wing being attached to the underside of the forward region of each of said spaced apart fuselages; said higher aft wing being aerodynamically spaced apart from and located above the aft region of each of said spaced apart fuselages;

an aft strut member disposed between said aft wing and each of said spaced apart fuselages for attaching said aft wing to said spaced apart fuselages, said aft strut members having a length sufficient to cause the wing tips of said lower forward wing and said upper aft wing to be vertically spaced apart a distance of at least 25% of the span of either of said wings; and a propulsion engine attached to each fuselage in a region between said wings and between said two independent spaced apart fuselages.

* * * * *